United States Patent [19]

Yamamoto et al.

[11] Patent Number: 5,541,783

[45] Date of Patent: Jul. 30, 1996

[54] DISK RECORDING MEDIUM AND DISK DRIVE UNIT WHEREIN THE PRODUCT OF THE NUMBER OF SERVO AREAS AND THE RECORDING/REPRODUCTION MODE SWITCHING TIME OF THE HEAD AMPLIFIERS IS 1200 OR LESS

[75] Inventors: Noriyuki Yamamoto, Tokyo; Hiroaki Yada, Kanagawa, both of Japan

[73] Assignee: Sony Corporation, Tokyo, Japan

[21] Appl. No.: 405,227

[22] Filed: Mar. 16, 1995

[30] Foreign Application Priority Data

Mar. 22, 1994 [JP] Japan .................................. 6-050101

[51] Int. Cl.$^6$ ............................. G11B 5/09; G11B 5/596
[52] U.S. Cl. ....................... 360/48; 360/51; 360/77.080
[58] Field of Search ............................. 360/48, 51, 77.08

Primary Examiner—W. Chris Kim
Attorney, Agent, or Firm—Limbach & Limbach; Philip M. Shaw, Jr.

[57] ABSTRACT

A disk drive for magnetic disk of the sample servo type, having N (N≧200) servo areas, wherein the product of N and the recording/reproduction mode switching time Th (µs) of the head amplifiers, i.e., N×Th, is designed to be 1200 or smaller.

40 Claims, 18 Drawing Sheets

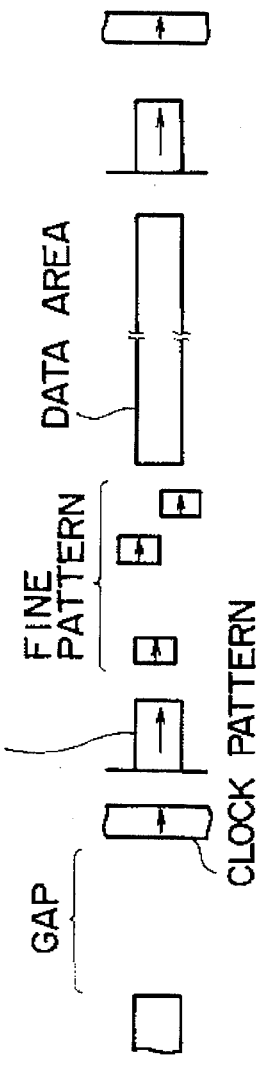
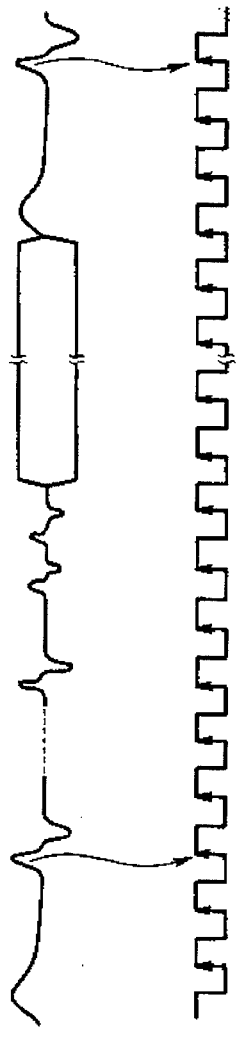
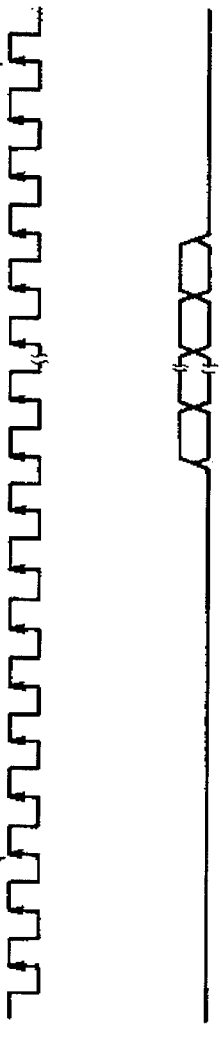
FIG. 13a TRACK PATTERN
FIG. 13b RECORDING/REPRODUCTION MODE SWITCHING SIGNAL
FIG. 13c CLOCK GATE SIGNAL
FIG. 13d REPRODUCTION WAVEFORM
FIG. 13e DATA CLOCK
FIG. 13f RECORD DATA

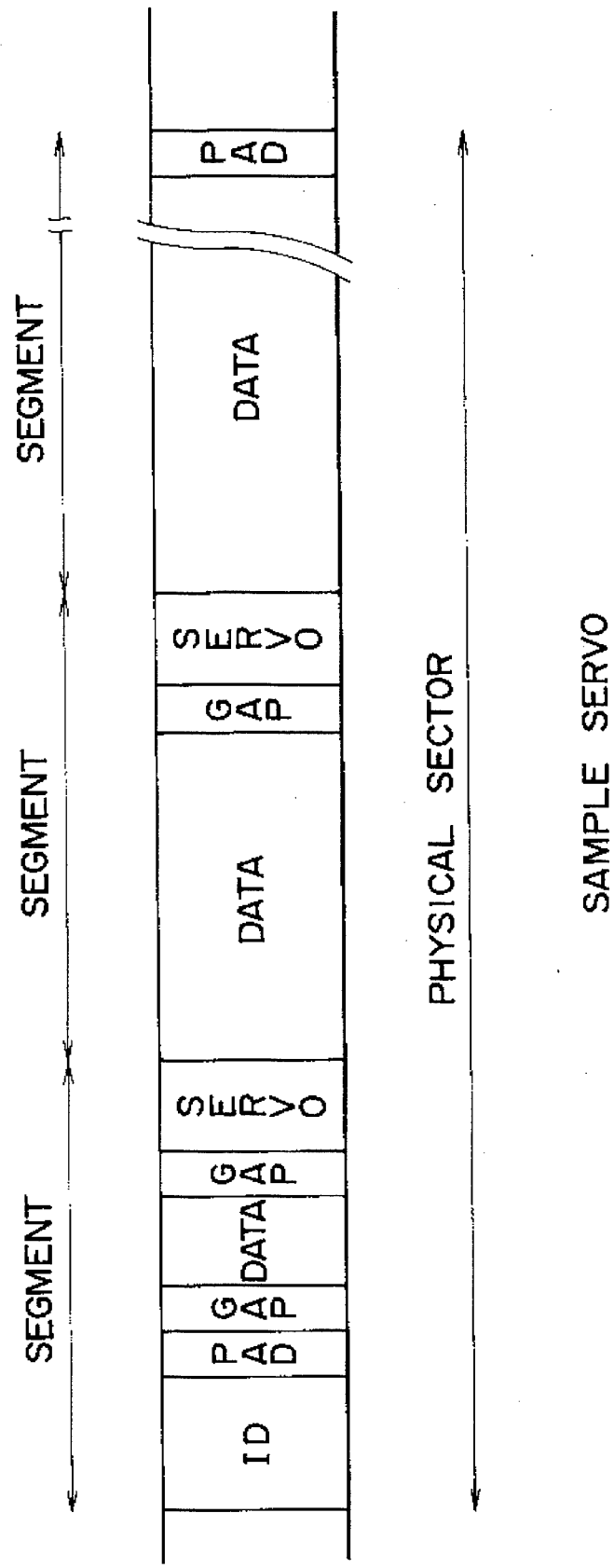

SAMPLE SERVO

DISK RECORDING MEDIUM AND DISK DRIVE UNIT WHEREIN THE PRODUCT OF THE NUMBER OF SERVO AREAS AND THE RECORDING/REPRODUCTION MODE SWITCHING TIME OF THE HEAD AMPLIFIERS IS 1200 OR LESS

BACKGROUND OF THE INVENTION

The present invention relates to disk shaped recording medium and a disk drive unit used suitably for such a disk shaped recording medium.

This invention technically relates to the U.S. patent application Ser. No. 144,970, based upon a Japanese priority application which was not yet published as of the filing date of the present application. The above U.S. application is owned by the assignee of the present invention.

FIG. 15 shows the basic arrangement of a magnetic disk 1. As shown in the figure, the magnetic disk 1 has each track partitioned into a plurality of sectors, and each sector is made up of a plurality of segments Conventionally, a compact magnetic disk unit that drives such a magnetic disk as the magnetic disk 1 employs the scheme of embedding the servo information at the positions where the disk surface is equally divided on the magnetic disk 1 (embedding servo system). This system falls into two types, i.e., the sector servo system and sample servo system. In the sector servo system, several tens of servo information areas (which will be termed simply "servo areas" hereinafter) are formed at the positions where the disk circuit is equally divided and the servo information is recorded there, whereas in the sample servo system, several hundreds of servo areas are formed as a convex/concave pattern.

Generally, in the sector servo system, a clock signal for providing the data recording/reproduction timing is extracted from the reference signal (preamble) recorded in the data area at the time of data writing or from a data string itself. Namely, the sector servo system can be said to be of the "self-synchronization type" In contrast, in the sample servo system, a clock signal provided for the data recording/reproduction timing is retrieved from a clock pattern that has been formed in advance with a physical means or magnetic means. Namely, the sample servo system can be said to be of the "external synchronization type".

FIG. 16 shows the format of sector adopted by disk units of the sample servo type. Each segment is basically partitioned into a data recording area for recording data and a servo area for recording the servo control signal as shown in the figure. In addition, the leading segment of each sector has the formation of an ID area for recording the ID (attribute information of the sector) of that sector. The capacity of the data area (capacity of user data) per sector is generally 512 bytes in the case of a compact magnetic disk, and an error correction code (ECC) is appended to the area.

A gap area, where nothing is recorded, is formed between the ID area and the data area. The ID is read out of the ID area and, after the consistency of it with the ID of the sector has been checked, data is recorded or reproduced in the succeeding data area. In this case, it takes some time to confirm the consistency of the ID read out of the ID area with the ID of the target sector. This gap area is provided to allow time for making the consistency determination. A "pad" is null data used during recording for recording correctly all codes left in the modulation circuit at the end of ECC, and is also used at reproduction for stably reading ECC up to the end.

FIGS. 17(a) and 17(b) show in detail the format of the servo area of a disk used by disk units of the sample servo type. The servo area has the formation of a clock pattern, access pattern and fine pattern as shown in the figure. FIG. 17(b) is a cross-sectional diagram of the track center taken along the dashed line b of FIG. 17(a). Reproduction of these patterns with the magnetic head reproduces isolated waveforms at the leading edge and trailing edge of the patterns. These patterns are formed by, for example, etching off part of a magnetic layer 1b which is formed on a substrate 1a. These patterns are d.c. magnetized in the lateral direction with a magnetic head.

Clock patterns are formed consecutively on lines of radius in a virtually radial arrangement on the magnetic disk 1, and a clock necessary for recording and reproduction is generated based on the clock pattern as a reference position. The time point of the peak of the reproduced isolated waveform of the clock pattern provides the data, system and servo system with clock information which is synchronous with the disk rotation.

The magnetic head positioning servo has two modes of track seek and tracking. The former mode is to move the head to a target track, and the latter mode is to position the head accurately at the center of the target track. The access pattern is used at track seeking. This pattern having a unique length and disposition for each track is created from the track address by Gray-like coding or the like. The pattern is formed by d.c. magnetizing the magnetic layer as mentioned above.

The fine pattern is used for tracking control. The fine pattern includes four pattern types of X, Y, A and B. Pattern X is formed on a track n and every second track from it (tracks n±2, n±4, . . . ). Pattern Y is formed on the tracks adjacent to the track n and every second track from them (tracks nil, n±3, . . . ). Pattern A is the same as the pattern X, but is formed by being shifted inwardly by a half track pitch. Pattern B is the same as the pattern Y, but is formed by being shifted inwardly by a half track pitch.

Formed between the data area and the clock pattern on the upstream side of the servo area (left side in FIG. 17(a)) is a gap where no control signal is recorded. After data has been recorded in the data area, when the servo area comes, it is necessary to reproduce the servo control signal recorded in this section. On this account, it is necessary to switch from the recording system to the reproduction system at the timing of the transition from the data area to the servo area.

However, the amplifier of the reproduction system cannot settle to the steady state immediately following the switching, and it takes some time for the normal operation. For dealing with this matter, the gap is provided for allowing time until the reproduction amplifier settles. In the case of the sample servo system, in order to generate a high-accuracy clock and retrieve sufficient servo signals, there are disposed servo areas at about several hundreds to several thousands of positions per track at a constant interval. Accordingly, many servo areas are cut in to a sector.

FIG. 18 shows the format of sector adopted by disk units of the sector servo type. Also in this case, as in the sample servo type basically, a sector is formed of 512-bytes of user data to which is added a sector ID and ECC data. However, the sector servo system needs various synchronizing marks because it is of the self-synchronization type. It further necessitates a long gap for absorbing the difference in length due to the positional vibration and rotational speed error.

Specifically, an ID preamble, ID sync mark (ID sync), pad, data preamble, data sync mark (data sync), pad, and inter-sector gap are needed.

The ID preamble and data preamble, which are for the recovery of PLL and establishment of bit synchronization, need 10 to 20 bytes each. The ID sync and data sync marks, which are for the establishment of byte synchronization, are formed of special patterns of several bytes. These marks are required before the ID (ID sync) and before logical data (data sync). The pad, which is null data used at recording for recording correctly all codes left in the modulation circuit at the end of ECC and used at reproduction for reading ECC up to the end stably, is required in the rear of the ID and in the rear of the logical data.

The sector servo system is inherently designed to place a servo area between logical sectors, and the number of logical sectors and the number of servo areas are conventionally equal (e.g., 30 to 80). In this case, the number of sectors is constant for any track throughout track positions on the disk, resulting in a significantly decreased memory capacity with respect to the physical capacity of the outer tracks due to low line density recording.

However, in order to meet the demand of increased storage capacity in recent years, the zone bit recording (ZBR) system, in which the disk surface is partitioned radially into several zones each having a specific constant line density (CLV), is becoming prevalent with the intention of reducing the difference of line density throughout track positions. In the sector servo system, with the ZBR system being adopted, the logical sector and servo area have no relation with each other, and a servo area cuts in between logical sectors. In this case, the synchronization of data between servo areas is lost, and it becomes necessary to place a preamble (data preamble) and recurrent sync (re-sync) mark (data sync) after a servo area has passed.

FIG. 19 shows in detail the format of the servo area of a disk used by disk units of the sector servo type. Servo areas are arranged radially at a constant interval, as in the case of the sample servo system. The number of servo areas is 30 to 80, which is about 1/10 of the sample servo system, and a servo area has a length that is twice or more of the sample servo system. The servo area includes an AGC burst, servo header, clock sync, pattern sync, index, access pattern and fine pattern. The AGC burst is an area provided for fixing the gain across the servo pattern. The fine pattern is not located at the track center and automatic gain control does not work normally for the fine signal, and therefore the gain needs to be fixed.

The servo header is a pattern indicative of a servo area, and it is a pattern that does not appear in the data area. The clock sync is the sync signal for the servo clock. The pattern sync is provided as the reference of time axis for the servo signal detection. The index is to obtain the rotational synchronism and rotational center, and only one index per circuit is provided, for example. The access pattern is to identify a track, and it is a Gray-like code. The fine pattern is a group of burst patterns such as X, Y, A and B. The use of the access pattern and the fine pattern is identical to the sample servo system.

The magnetic disk 1 desirably has as much storage capacity as possible, and for an increased storage capacity, it is necessary at first to increase the surface recording density. At the same time, it is necessary to enhance the efficiency of the data format. For the enhancement of the data format efficiency, the following problems arise in the above-mentioned disks of the sample servo type and sector servo type. Problems of magnetic disk of sample servo type:

A magnetic disk of the sector servo type uses about 5 to 10% of each track for the servo area, whereas a magnetic disk of the sample servo type uses about 10 to 20% of each track for the servo area for the need of an increased number of servo areas. In addition, each servo area needs to be preceded by a gap equivalent to the recording/reproduction mode switching time of the head amplifiers, and therefore it is difficult for a magnetic disk of the sample servo type to enhance the format efficiency. Problems of magnetic disk of sector servo type:

A magnetic disk of the sector servo type uses both the servo clock and data clock created asynchronously with the disk rotation from a preamble (e.g., string of 1's and 0's) written on the disk. For the byte-wise synchronization, it needs a byte synchronizing mark. Accordingly, it needs tens of bytes of area only for the sync information area. In addition, since the data clock is generated asynchronously with the disk rotation, the length of data writing varies due to the unevenness of disk rotation. On this account, longer gaps are needed between a servo area and data recording area and between sectors.

Today's magnetic disk units use zone bit recording in order to increase the storage capacity as mentioned previously. Therefore, servo areas are cut into logical sectors in many zones. At each event, a preamble, synchronizing mark and gap are required. These matters must be considered for each logical sector, and therefore it is inevitable for each logical sector to have an overhead of about 60 bytes or more.

In view of the foregoing situation, the present invention is intended to enhance the efficiency of the data format for a disk of the sample servo type.

SUMMARY OF THE INVENTION

The above discussed problems of prior art disk drive units are overcome by the present invention of a disk drive unit of the type for recording or reproducing data through head amplifiers (e.g., recording amplifier 23 and reproduction amplifier 28 shown in FIG. 11) on a disk on which data areas for recording data and servo areas for recording servo information are formed, wherein the improvement resides in forming 200 or more servo areas per track and choosing the recording/reproduction mode switching time Th (µs) of the head amplifiers so that the number N of servo areas per track multiplied by the sum of the length of one servo area Ts (µs) and Th, i.e., N×(Ts+Th), is less than or equal to 16,600−(25,600/(D×R))×C, where C (bytes) is the capacity per track, D (bits/mm) is the line density and R (mm) is the radius.

In another embodiment, the servo areas per track are formed such that the product N×(Ts+Th) is smaller than or equal to 2,830+14,080,000/(D×R).

In still another embodiment, the servo areas are formed so that the number of servo areas N multiplied by the head amplifier recording/reproduction mode switching time Th, i.e., N×Th, is smaller than or equal to 1,200 or smaller than or equal to 600. The disk may be a magnetic disk.

For the disk drive unit arranged as described above, the value of N×(Ts+Th) is set smaller than or equal to 16,600−(25,600/(D R))×C. Accordingly, it becomes possible for a disk of the sample servo type to have its format efficiency improved more than a disk of the sector servo type.

According to another embodiment of the invention, a disk shaped recording medium of the type which includes a plurality of tracks, comprises a plurality of data areas in each track for recording data, a plurality of servo areas in each track for recording servo information, each servo area being separated from an immediately preceding data area by a different gap of a plurality of gaps in each track, and wherein each gap of the plurality of gaps accommodates a mode switching time Th (in μs) for allowing a reproduction amplifier to settle when switching from a recording amplifier to the reproduction amplifier of a recording and reproduction apparatus, and wherein each gap has a length (measured in μs) which is greater than or equal to 1.5 μs and less than or equal to $16,600/N-Ts-(25,600 \times C)/(D \times R \times N)$, where Ts (in μs) is a length of one of the servo areas, N ($\geq 200$) is the desired number of servo areas per track, C (in bytes) is a desired capacity per track, D (in bits/mm) is a desired line density and R (in mm) is a desired radius.

BRIEF DESCRIPTION OF THE DRAWINGS

FIGS. 13(a) to 13(f), inclusive, are timing charts explaining the operation of the embodiments shown in FIG. 11 and FIG. 12.

FIG. 16 is a diagram explaining the format of the magnetic disk of the sample servo type.

DETAILED DESCRIPTION OF THE PREFERRED EMBODIMENTS

Figure 17A:
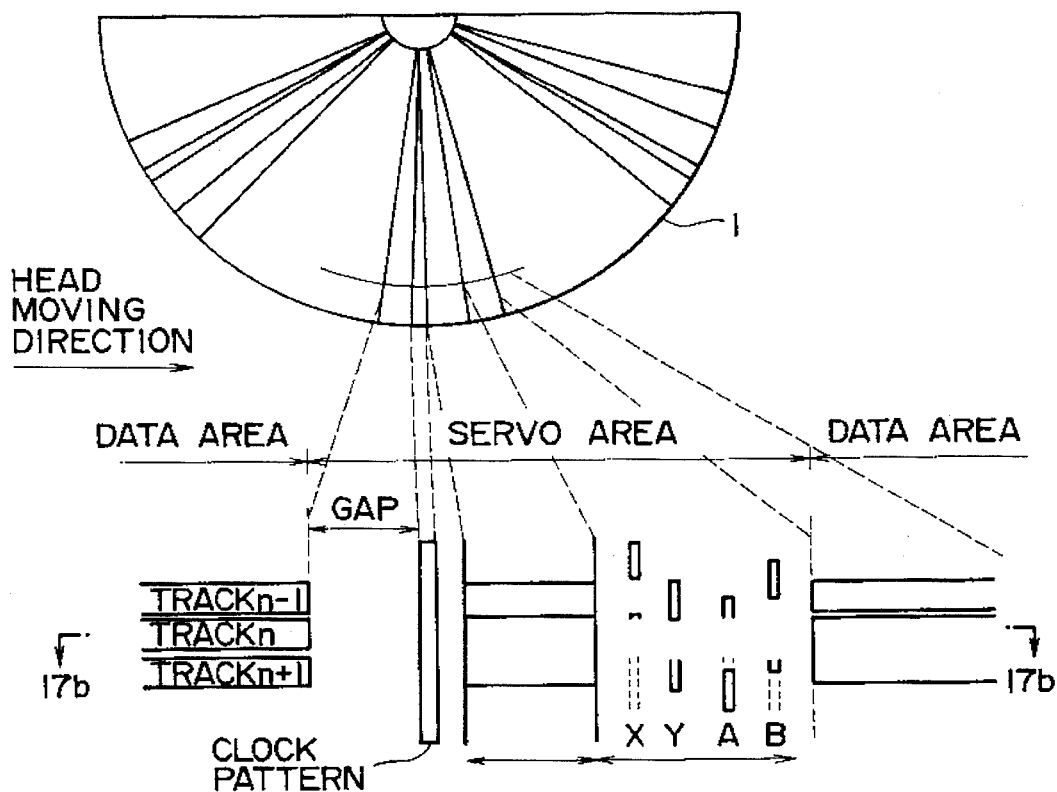
FIGS. 17(a) and 17(b) are diagrams explaining the format of the servo area section of the conventional magnetic disk of the sample servo type.
Figure 17B:
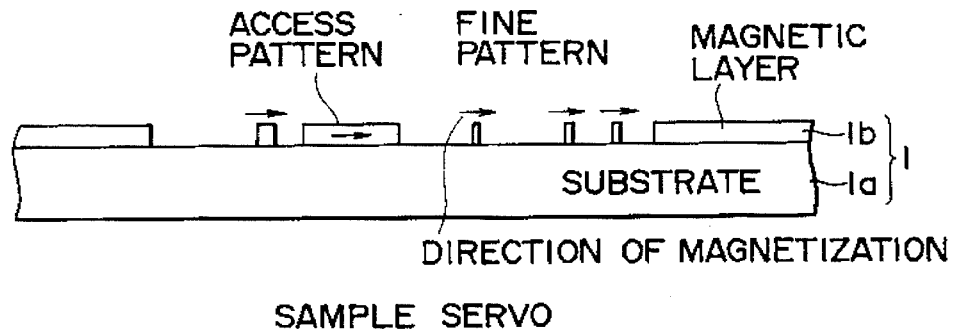
Figure 18:
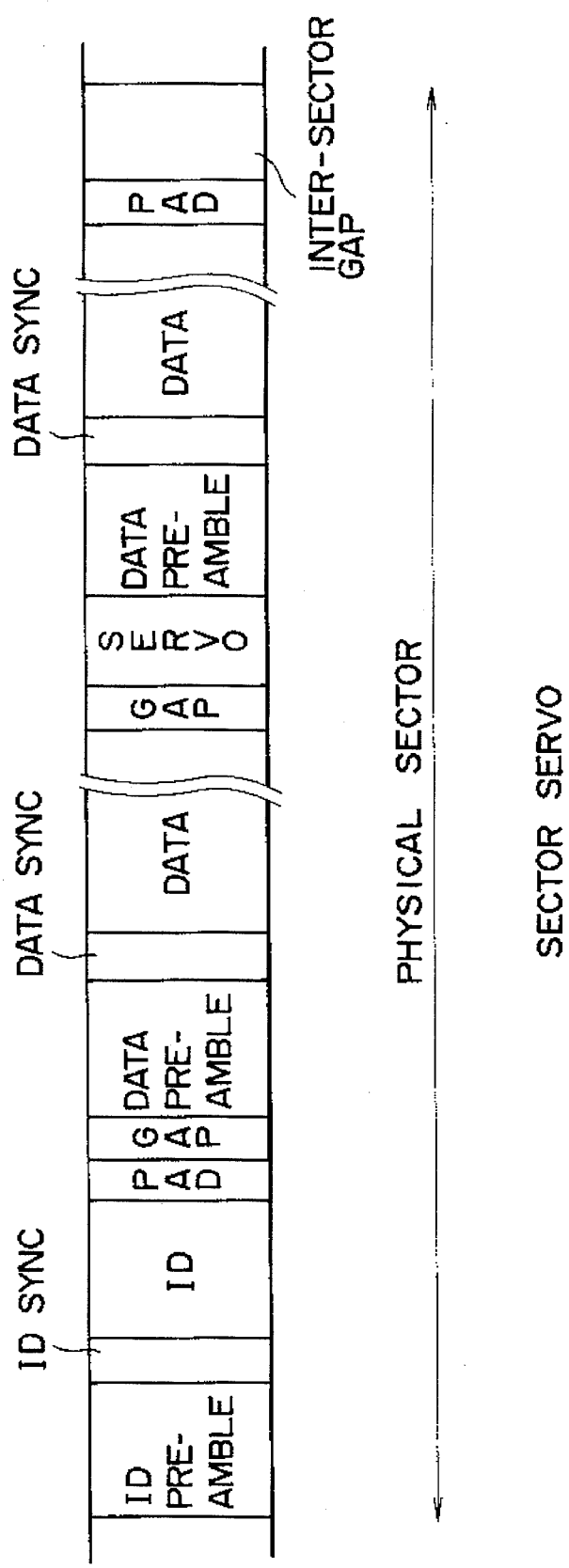
FIG. 18 is a diagram explaining the format of the conventional magnetic disk of the sector servo type.
Figure 19:
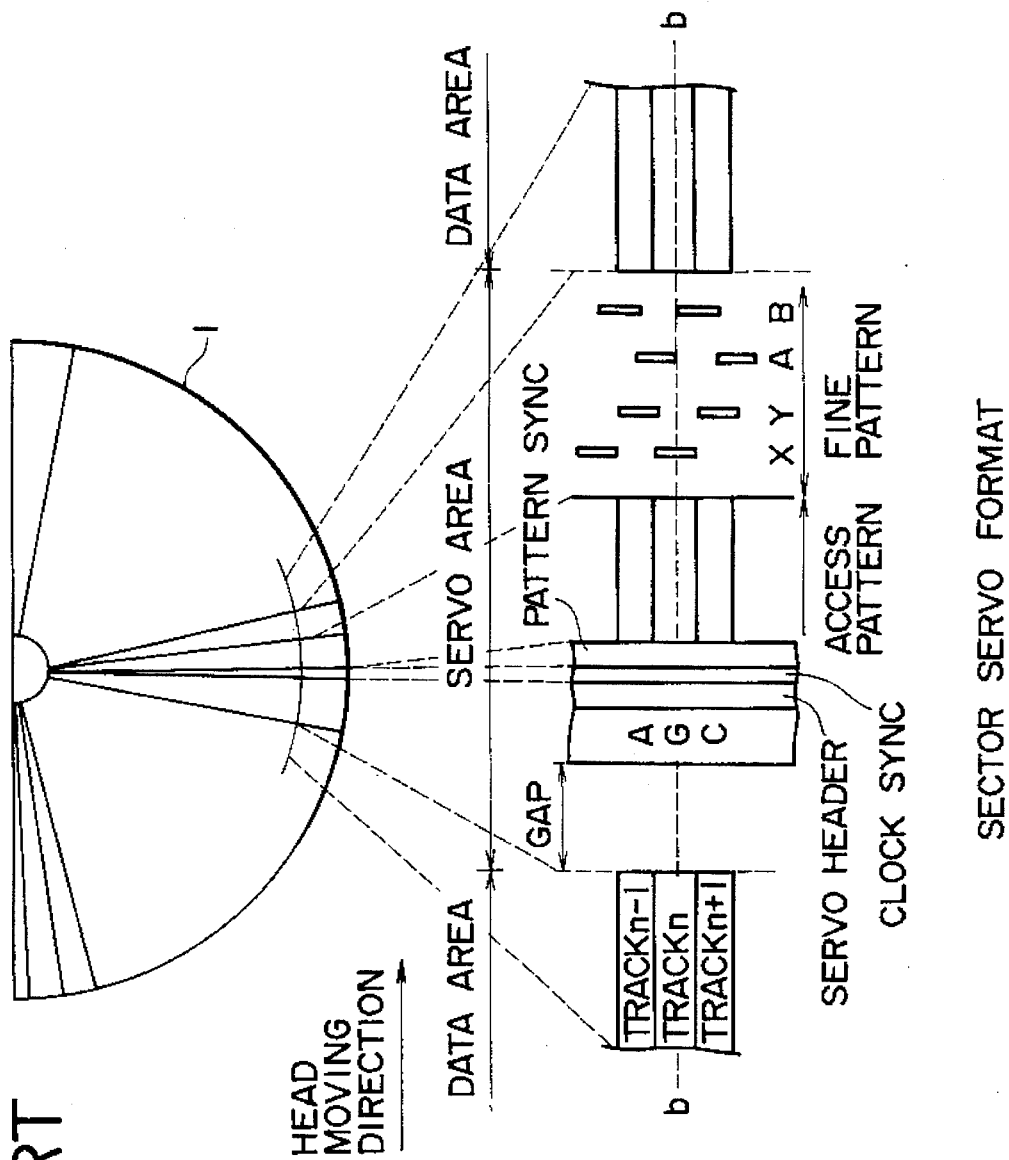
FIG. 19 is a diagram explaining the format of the servo area section of the conventional magnetic disk of the sector servo type.

The magnetic disk unit which is an application of the inventive disk drive unit uses a magnetic disk of the sample servo type, and it has a basic data layout, as shown in FIG. 16 and FIGS. 17(a) and 17(b), which is identical to the conventional one. The disk is designed to meet the conditions shown in the following embodiments.

Figure 1:
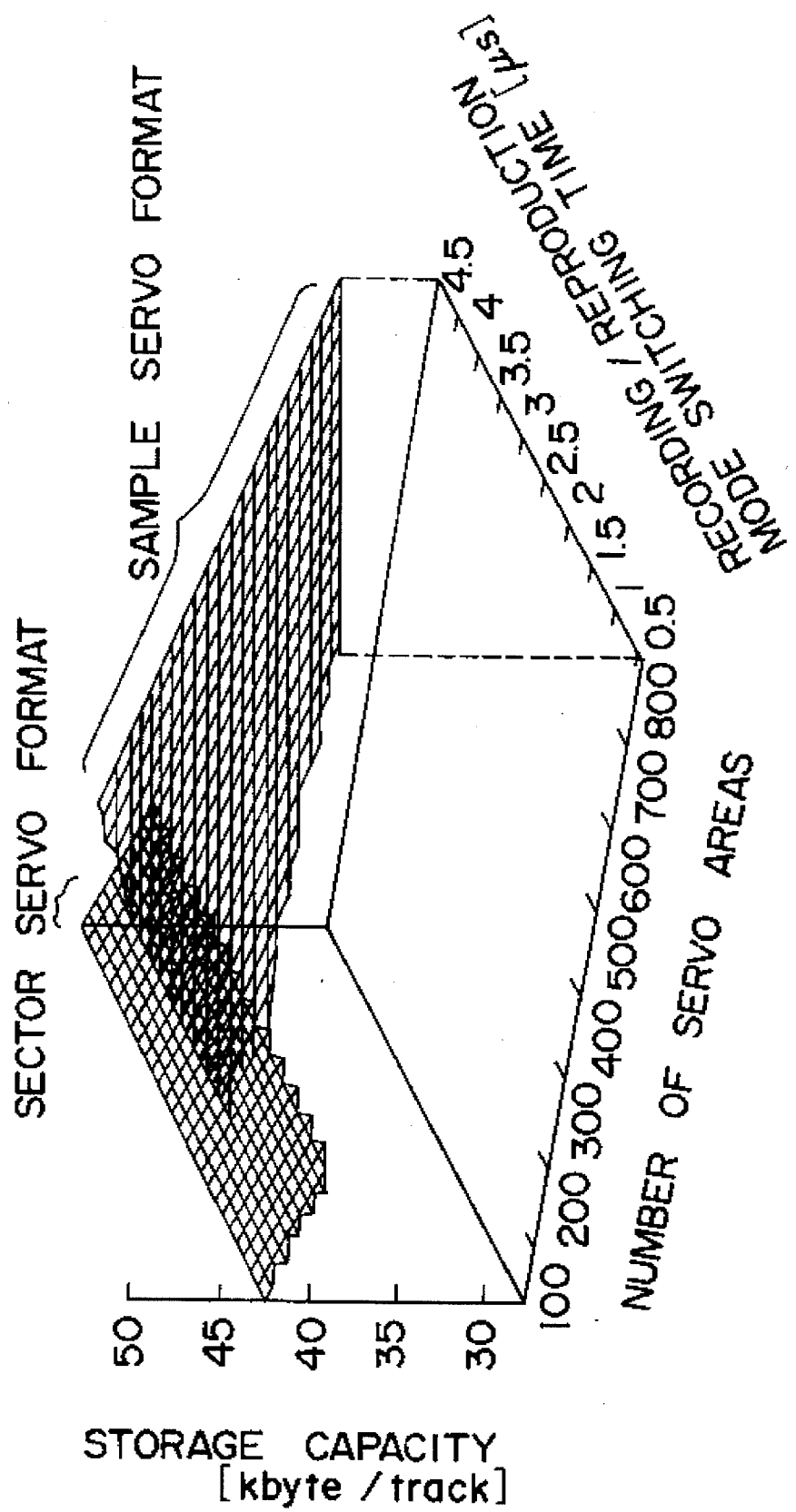
FIG. 1 is a diagram showing the result of simulation.

Embodiment 1:

Condition of simulation pertinent to this invention:

FIG. 1 shows the result of simulation on the storage capacity per track which varies depending on the number of servo areas and the recording/reproduction mode switching time of the head amplifiers. Table 1 lists the values assumed for the simulation.

TABLE 1

| Item | Value | Unit |
| --- | --- | --- |
| Revolutions, per second | 60 | /s |
| Radius of track | 20 | mm |
| Line density | 4000 | bit/mm |
| Logical sector length | 512 | byte |
| Data sector ID+ECC | 30 | byte |
| Channel coding | 8/9 | |
| Share of servo area (sector servo) | 7.2 | % |
| Share of servo area (sample servo) | 11.52 | % |
| Overhead length (sector servo) | 80 | byte |
| Re-sync mark length (sector servo) | 20 | byte |
| Overhead length (sample servo) | 10 | byte |

The simulation was conducted for the numbers of servo areas ranging from 30 to 80 for the sector servo format and ranging from 200 to 800 for the sample servo format. In FIG. 1, the range of areas from 80 to 200 has no real meaning.

As listed in Table 1, for the sector servo format, the occupancy rate of servo areas per track is 7.2% (in the case of 60 revolutions/sec, the product of the number of servo areas and the time per servo area is 1200, for these values of 60 and 20 μs for example) and the overhead length is 80 bytes. The re-sync mark means inclusive of the preamble, which is needed for the recovery of bit synchronism and byte synchronism at cut-in of a sector servo area, and the sync mark. In the sector servo system, re-sync must be considered due to the assumption of zone bit coding. The overhead length includes a 18-byte preamble of ID, an 18-byte preamble of data, a 2-byte ID, a 2-byte sync mark, a 2-byte ID pad, a 2-byte data pad, a 6-byte gap between ID and data, and a 30-byte gap between sectors.

For the sample servo format, the occupancy rate of servo areas per track is 1.52% (in the case of 60 revolutions/sec, the product of the number of servo areas and the time per servo area is 1920 for these values of 400 and 4.8 μs, for example). The overhead length is 10 bytes, which includes a 2-byte ID pad, a 2-byte data pad, and a 6-byte gap between the ID and the data. The remaining parameters (from revolutions to channel coding in the Table 1) are common to both systems.

The method of capacity calculation in this simulation is as follows. One data storage area which is useful for storing data is a one-track area from which is subtracted a servo area and an area equivalent to the recording/reproduction mode switching time in the case of the sample servo system, and from which is further subtracted an area of the re-sync mark length in the case of the sector servo system. One block (unit area of recorded data) is an area of one-sector of user data (512 bytes) to which is added areas of the sector ID, ECC and overhead length.

For "r" revolutions/sec, a line density of "dens" (bits/mm), a radius of "rad" (mm), number of servo areas of "#sv", servo area length of "sv" seconds (s), recording/reproduction mode switching time of "wr" in seconds (s), and re-sync mark length of "rsync" in seconds (s), the following equations hold:

the capacity per track "trb", i.e., the physical capacity= $2 \times rad \times \pi \times dens \times 1/8$ (bytes);

the data storage area=$trb \times (1-\#sv \times (wr+sv)-\alpha \times rsync)$ (bytes), where $\alpha$ is a constant; and a block=(1-sector user data+sector ID+ECC)$\times 9/8$+overhead (bytes).

Figure 2:
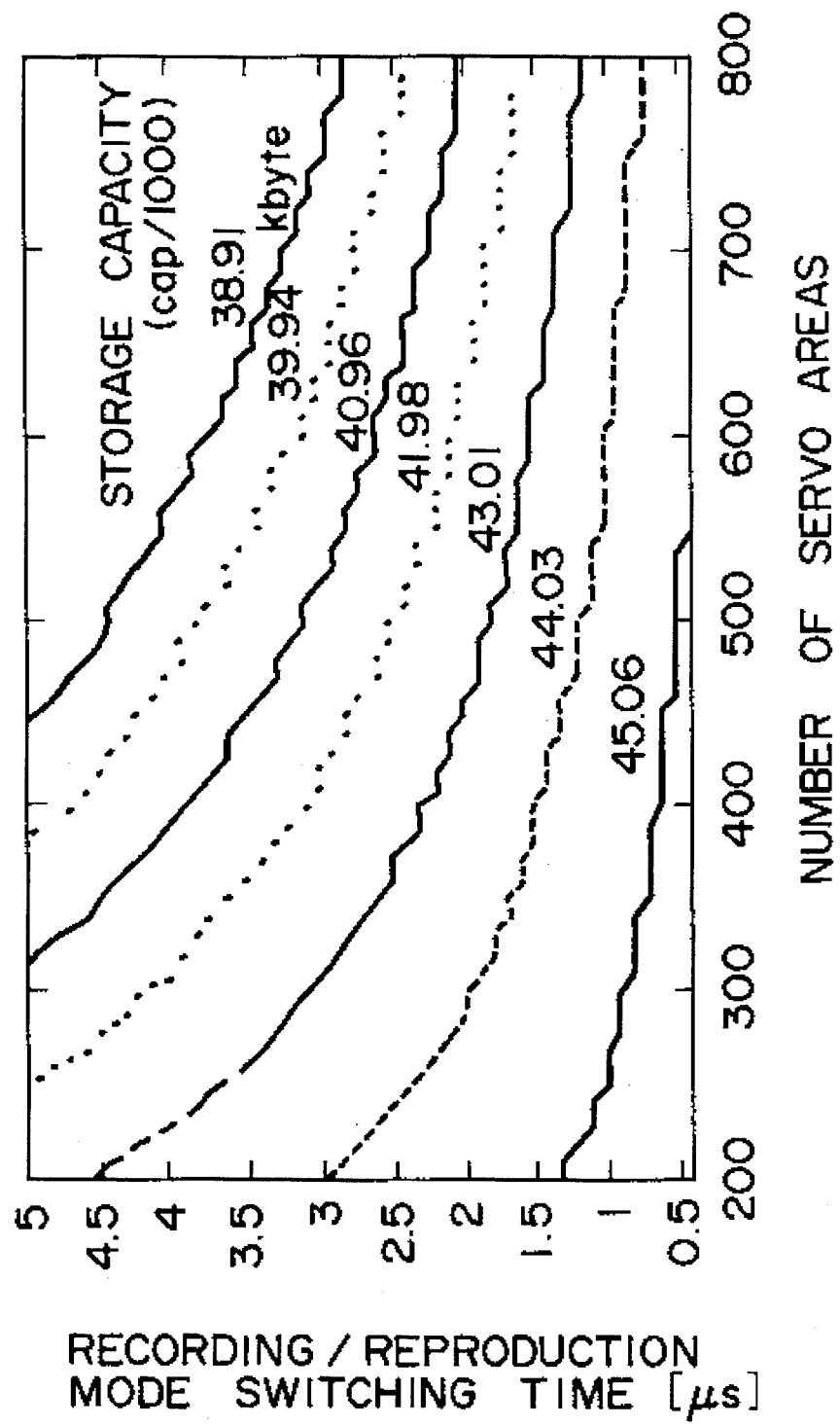
FIG. 2 is a diagram showing contour lines of the storage capacity resulting from the simulation of FIG. 1.

The storage capacity (format capacity) is the number of blocks that 1-track of data storage area can contain multiplied by 512 bytes of 1-sector of user data as follows:

Storage capacity (cap)=512×INT(data storage area per block); where INT stands for the operator that evaluates the integer of the result of the calculation in the subsequent parentheses). Result of simulation:

FIG. 1 shows the variation of the storage capacity per track evaluated by varying the number of servo areas and the recording/reproduction mode switching time of the head amplifiers. FIG. 2 shows by contour lines the storage capacity per track for the domain of sample servo format of FIG. 1. The figure reveals that the product of the number of servo areas and the recording/reproduction mode switching time of the head amplifiers takes a constant value for each storage capacity per track. The product of the number of servo areas (#sv) and the head amplifier recording/reproduction mode switching time (wr) (time is measured always in μs in the following simulation), i.e., #sv×wr, is symbolized to be "WR". The product of the number of servo areas (#sv) and the time per servo area (sv), i.e., #sv×sv, is symbolized to be "SV". The storage capacity per track is symbolized to be the "cap" in bytes.

Figure 3:
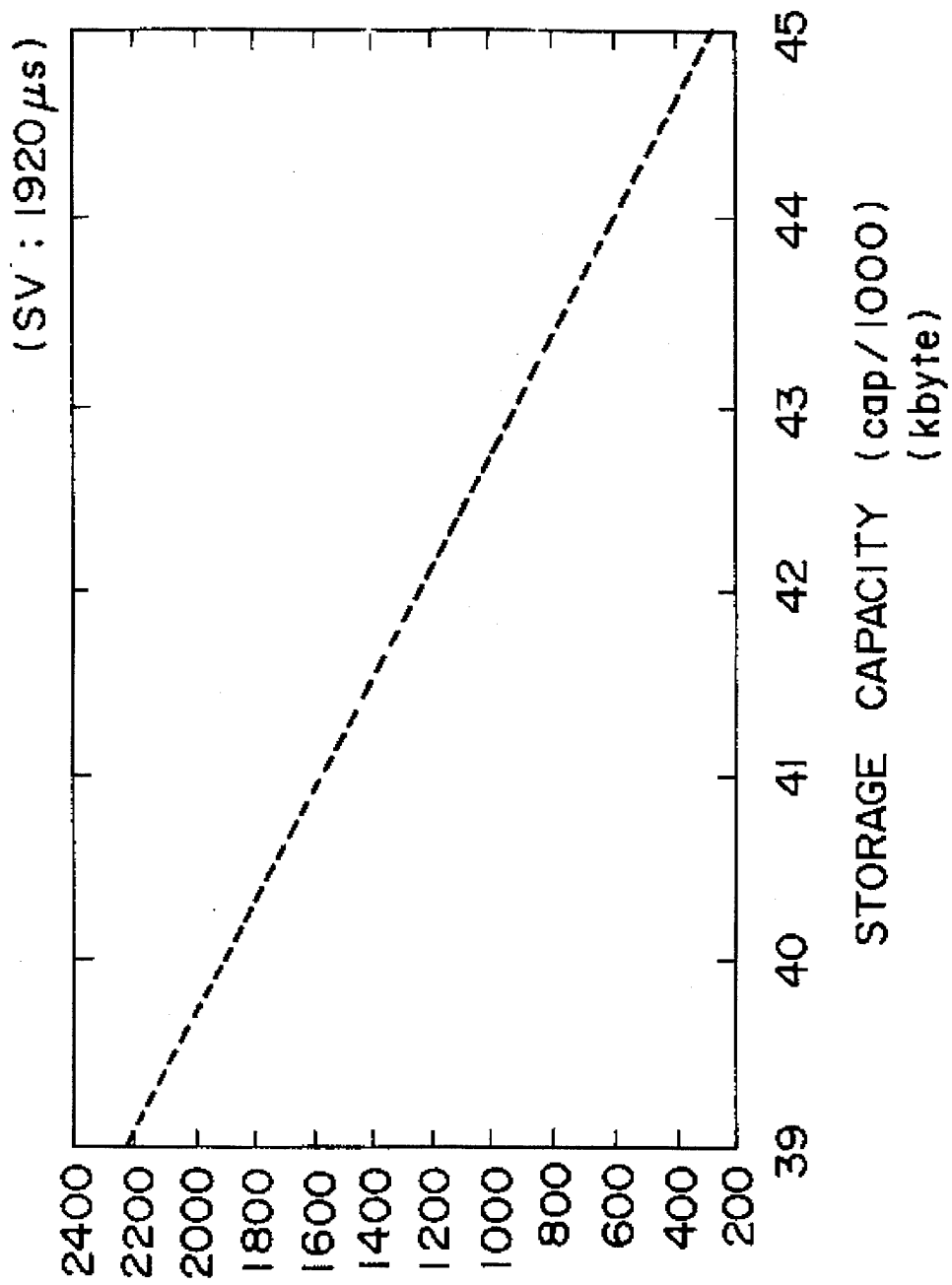
FIG. 3 is a diagram showing the relation between the storage capacity and the number of servo areas multiplied by the recording/reproduction mode switching time based on the simulation of FIG. 1.

FIG. 3 shows the relation between the storage capacity per track (cap) shown in FIG. 2 and the product WR of the number of servo areas (#sv) and head amplifier recording/reproduction mode switching time (wr). From this graph, the following approximate equation is derived:

$$WR=14700-0.32 \times cap \qquad (1)$$

(for a dens=4000 bits/mm; SV=1920).

Figure 4:
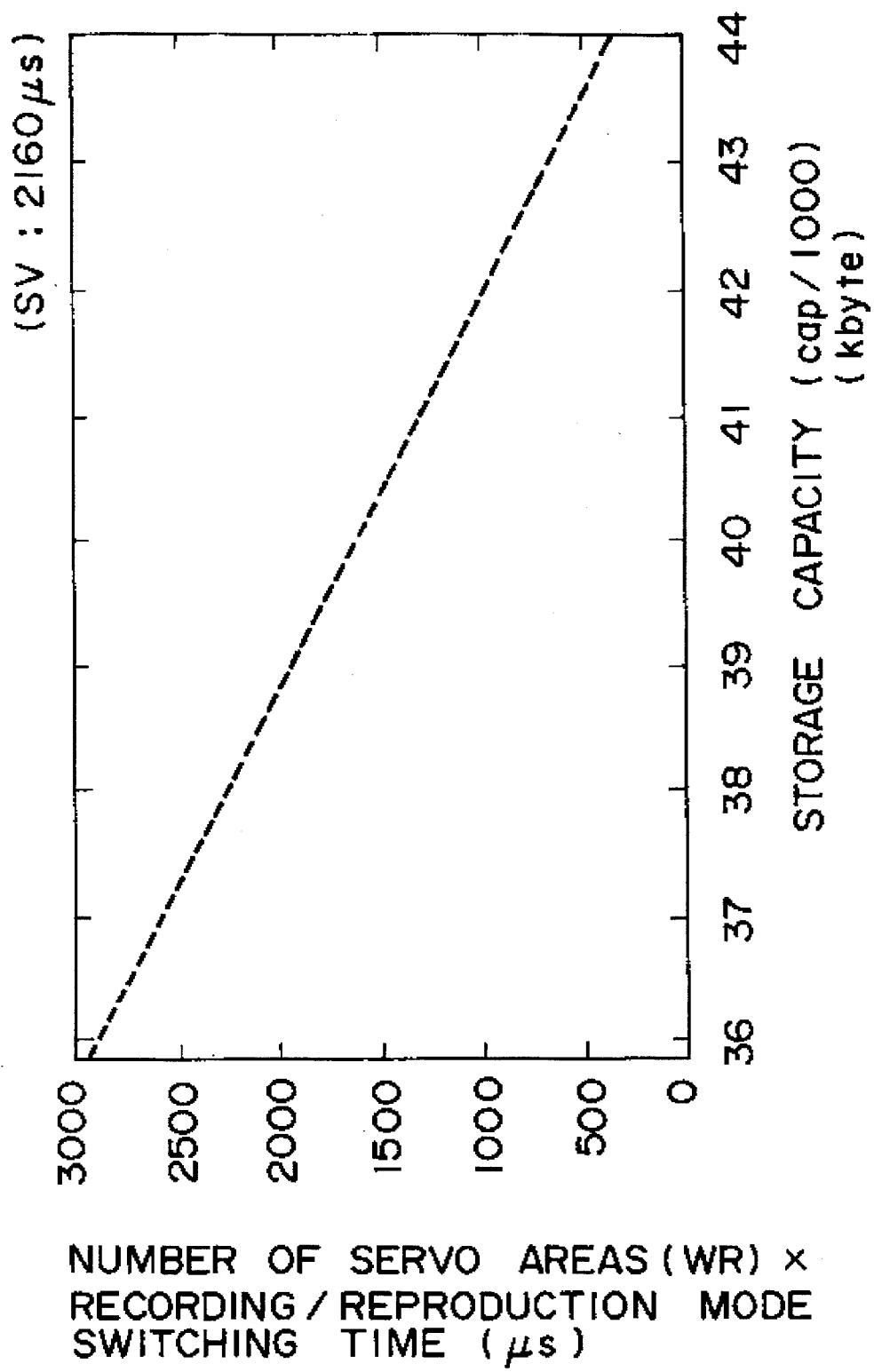
FIG. 4 is a diagram showing the relation between the storage capacity and the number of servo areas multiplied by the recording/reproduction mode switching time when the servo occupancy rate is 12.96%.

FIG. 4 shows the same kind of relation as FIG. 3 for a 12.96% occupancy rate of the servo area, i.e., the product SV of the number of servo areas (#sv) and the time per servo area (sv) is 2160.

Figure 5:
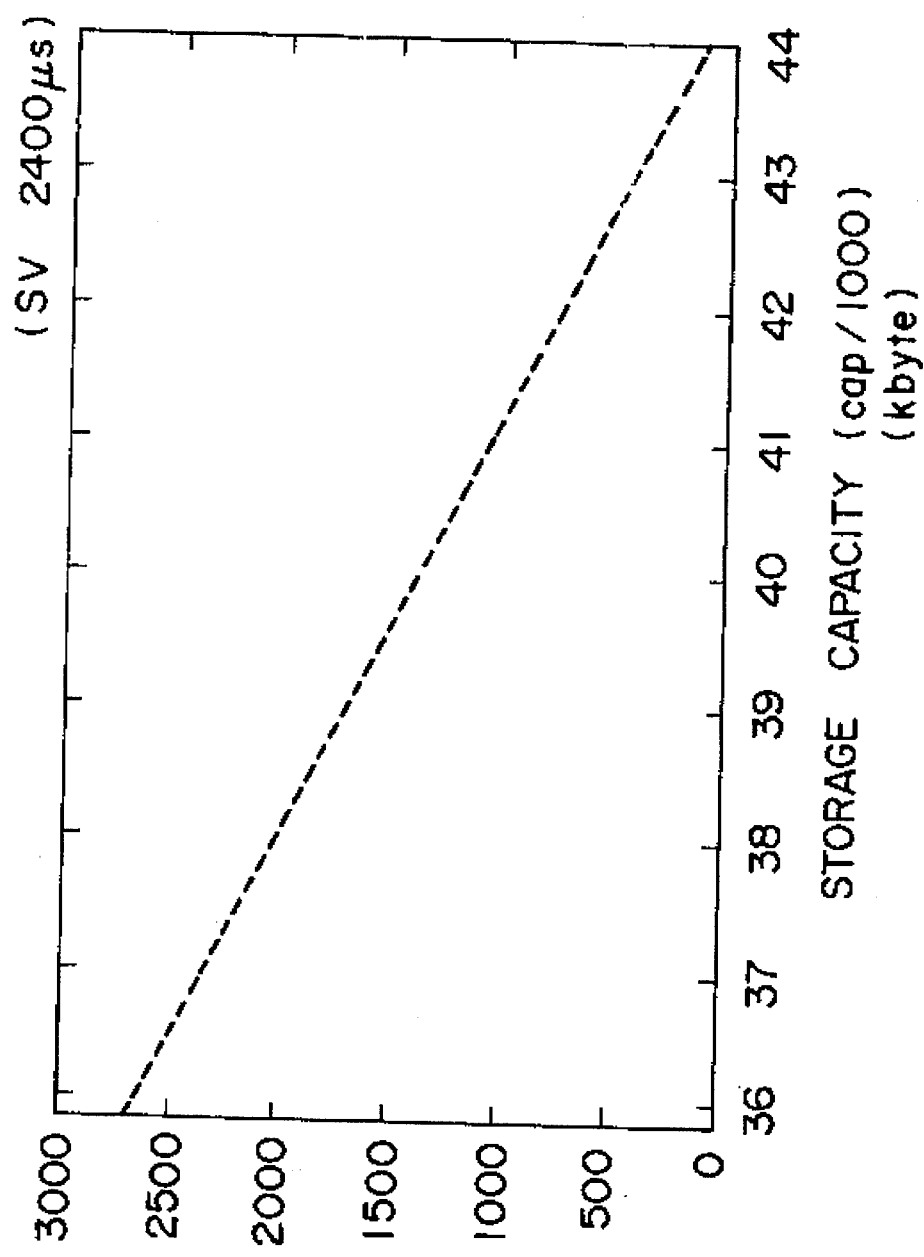
FIG. 5 is a diagram showing the relation between the storage capacity and the number of servo areas multiplied by the recording/reproduction mode switching time when the servo occupancy rate is 14.40%.

FIG. 5 shows the same kind of relation as FIG. 3 for a 14.40% occupancy rate of the servo area, i.e., the product SV of the number of servo areas (#sv) and the time per servo area (sv) is 2400.

For FIG. 4 and FIG. 5, parameters other than the occupancy rate of servo area are as listed in Table 1.

From these graphs, the following approximate equations are derived:

$$WR=14420-0.32 \times cap \qquad (2)$$

(for a dens 4000 bits/mm; SV=2160)

$$WR=14200-0.32 \ cap \qquad (3)$$

(for a dens 4000 bits/mm; SV=2400).

When the SV is added to each of the equations (1), (2) and (3), their constant terms are evaluated to be 14700+1920= 16620, 14420+2160=16580, and 14220+2400=16600, respectively, and the following conditional equation holds based on the average value 16600:

$$WR+SV=16600-0.32 \ cap \qquad (4)$$

Figure 6:
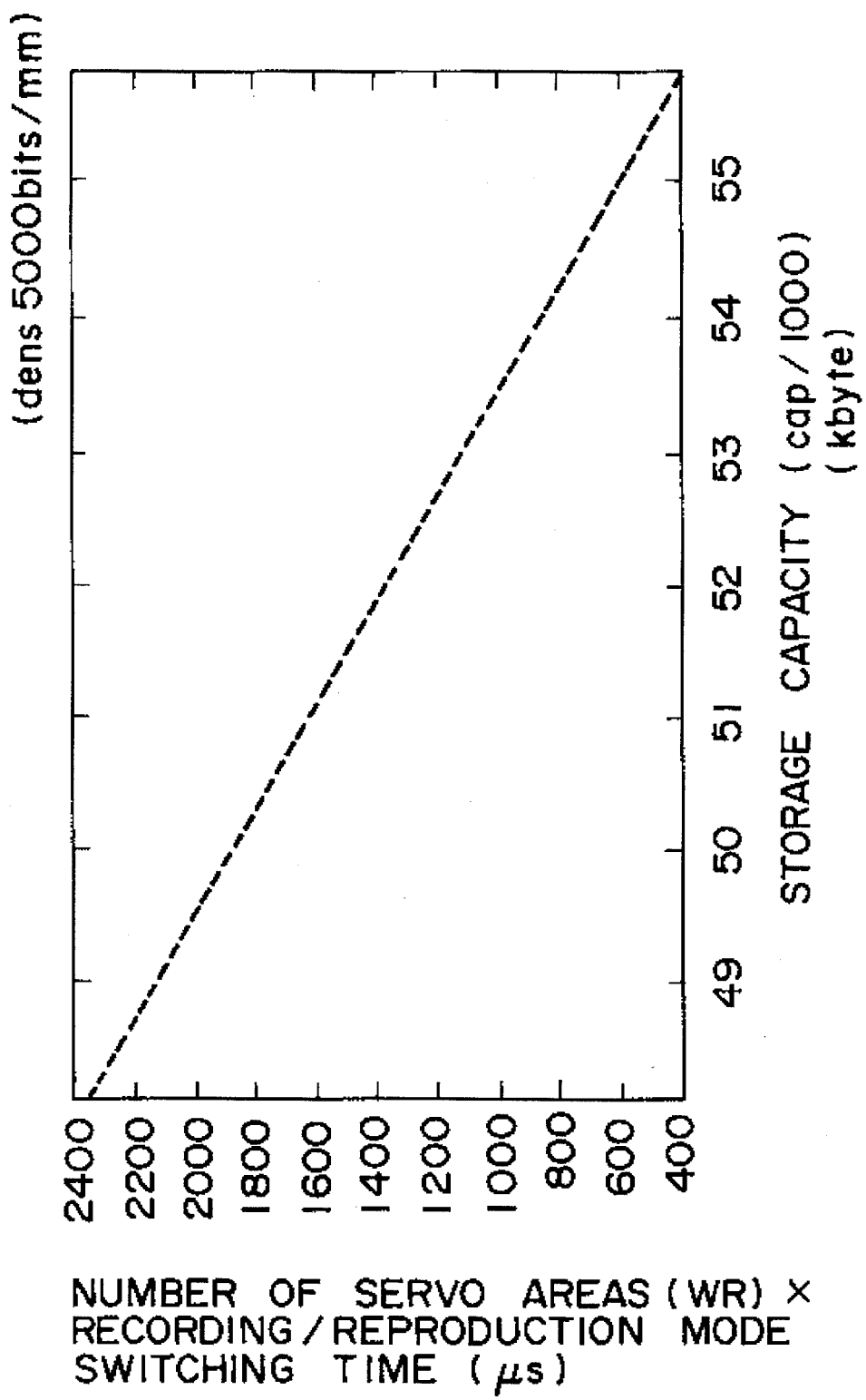
FIG. 6 is a diagram showing the relation between the storage capacity and the number of servo areas multiplied by the recording/reproduction mode switching time when the line density is 5000 bits/mm.
Figure 7:
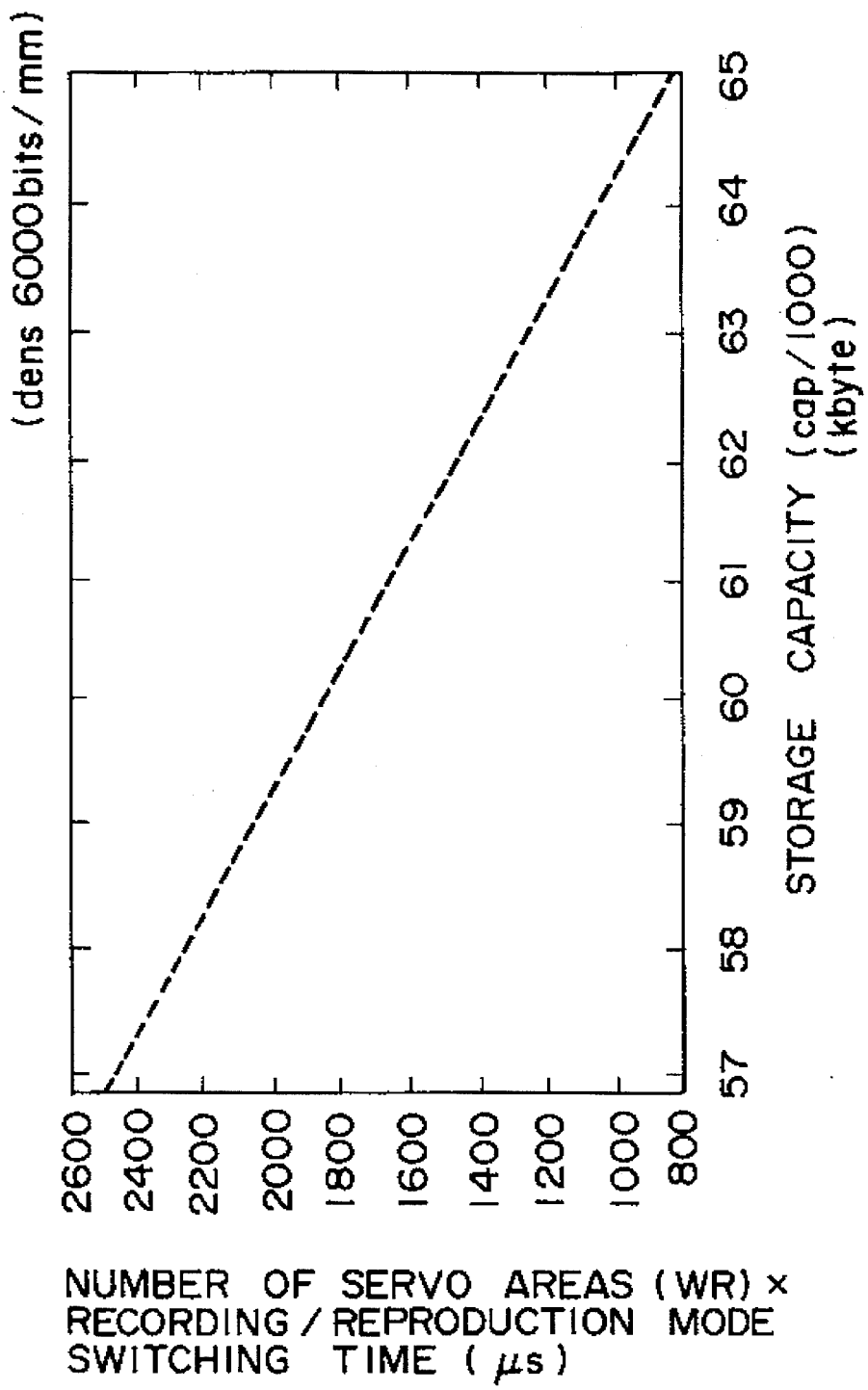
FIG. 7 is a diagram showing the relation between the storage capacity and the number of servo areas multiplied by the recording/reproduction mode switching time when the line density is 6000 bits/mm.

FIG. 6 and FIG. 7 show the same kind of relation as FIG. 3 for an 11.52% occupancy rate of servo area, i.e., the product SV of the number of servo areas (#sv) and the time per servo area (sv) is 1920, with the line density being varied. Parameters other than the line density are as listed in Table 1. FIGS. 3, 4 and 5 are for a line density (dens) of 4000 bits/mm, FIG. 6 is for a line density (dens) of 5000 bits/mm, and FIG. 7 is for a line density (dens) of 6000 bits/mm.

From these figures, the following conditional equation is derived:

$$WR+SV=16600-(1280/dens) \times cap \qquad (5)$$

(for a radius of 20 mm).

Figure 8:
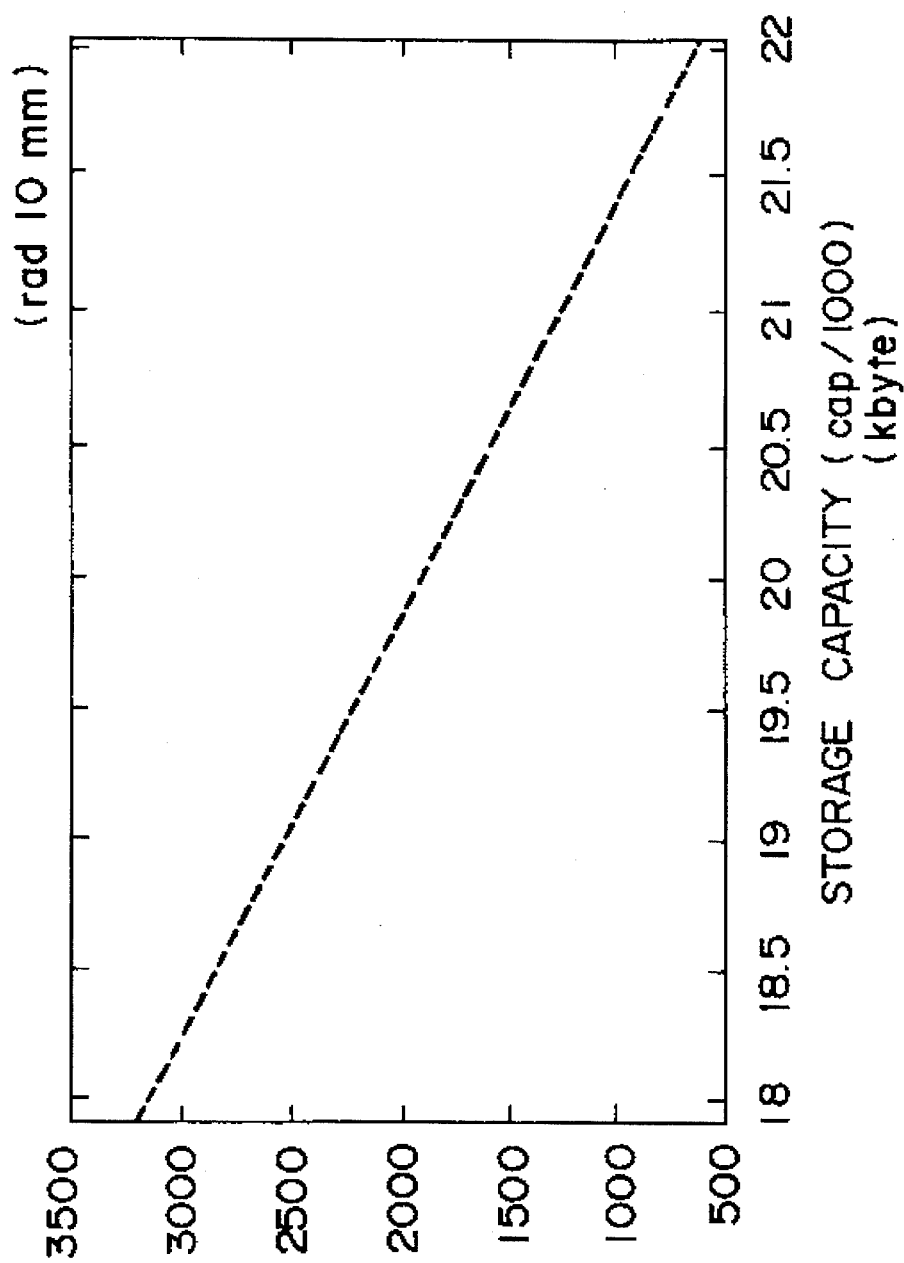
FIG. 8 is a diagram showing the relation between the storage capacity and the number of servo areas multiplied by the recording/reproduction mode switching time when the radius is 10 mm.
Figure 9:
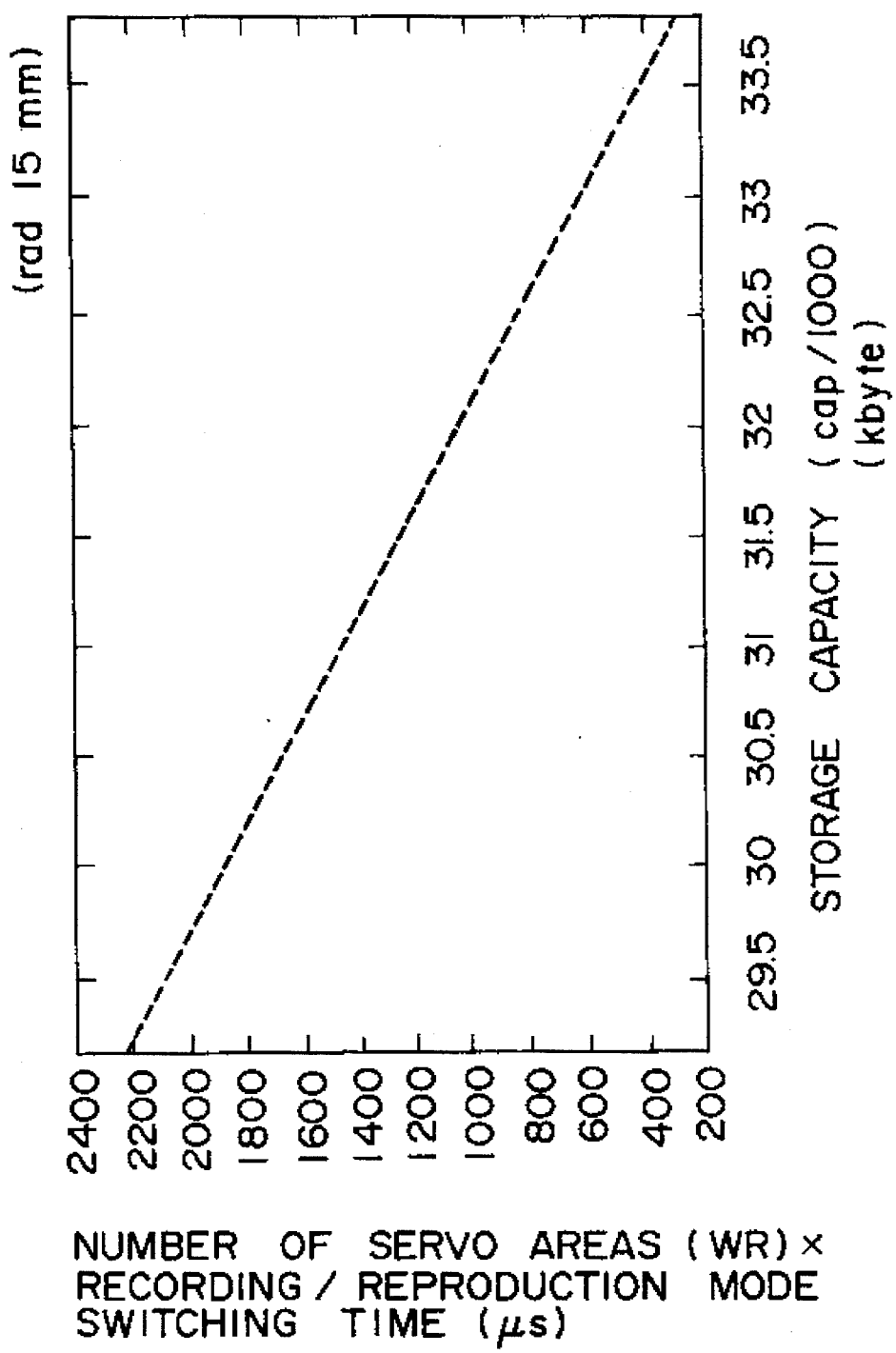
FIG. 9 is a diagram showing the relation between the storage capacity and the number of servo areas multiplied by the recording/reproduction mode switching time when the radius is 15 mm.

FIG. 8 and FIG. 9 show the same kind of relation as FIG. 3, with the radius being varied. Parameters other than the radius are as listed in Table 1. FIGS. 3 through 7 are for a radius of 20 mm, FIG. 8 is for a radius of 10 mm, and FIG. 9 is for a radius of 15 mm.

From these figures, the following conditional equation is finally derived:

$$WR+SV=16600-(25600/(dens \times rad)) \times cap \qquad (6)$$

Accordingly, in the Embodiment 1, the head amplifier recording/reproduction mode switching time, the length of servo area and the number of servo areas are selected for a given recording line density and radius such that the following formula is satisfied for the storage capacity per track:

$$WR+SV \leq 16600-(25600/(dens \times rad)) \times cap \qquad (7)$$

For example, when a storage capacity of 40000 bytes per track is required with a line density of 4000 bits/mm and a radius of 20 mm, a format of 400 servo areas and a 6 μs servo area length is selected and head amplifiers with a 1.8 μs recording/reproduction mode switching time are used. In order to accommodate such a recording/reproduction mode switching time, a gap equivalent to 1.8 μs is therefor placed immediately after the data area. This gap has a length of about 13.6 μm in the case of 60 revolutions/sec and a radius of 20 mm, for example. Consequently, servo information can surely be reproduced during the passage of the head over the servo area following data recording. The practicability of this format is proved by the foregoing simulation.

Figure 10:
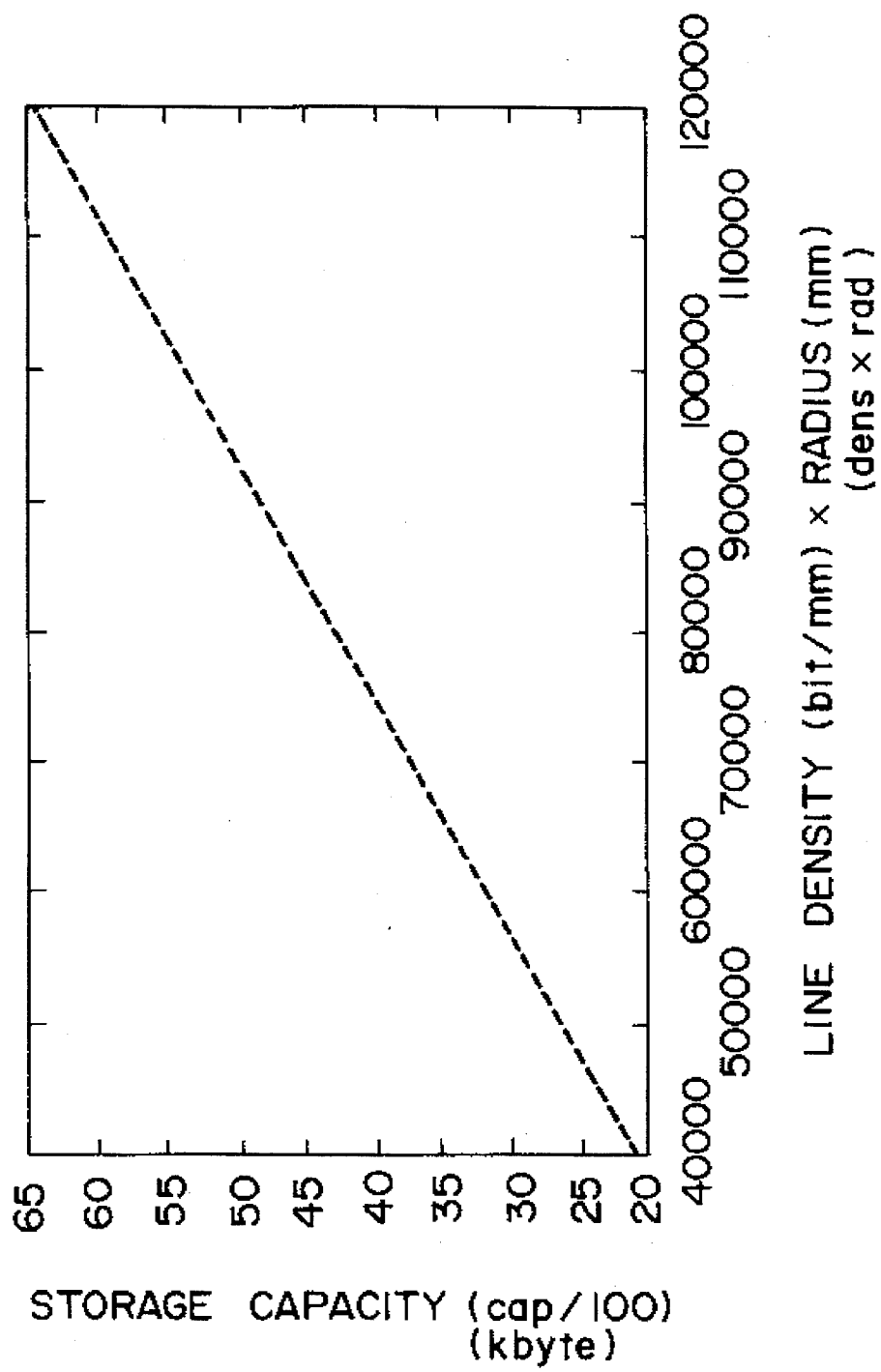
FIG. 10 is a diagram showing the relation between the line density multiplied by the radius and the storage capacity of the case of the maximum storage capacity based on the sector servo format.

Embodiment 2:

FIG. 10 shows the relation between the product of the recording line density and the radius (dens×rad) and the storage capacity (cap) for attaining the best storage capacity for the sector servo area, with the parameters of Table 1 being applied. From this graph, the following equation holds:

$$cap=0.538 \times dens \times rad-550 \qquad (8)$$

In order for the sample servo format to be superior over the sector servo format in terms of the storage capacity, it is necessary that the value of cap in Equation (7) is greater than or equal to the cap evaluated by the Equation (8). Accordingly, by substituting the cap of Equation (8) into the Equation (7), the following conditional formula (9) for the superiority of the sample servo format in terms of the storage capacity is obtained:

$$WR+SV \leq 2830+14080000/(dens \times rad) \quad (9)$$

In this embodiment, the head amplifier recording/reproduction switching time, the servo area length and the number of servo areas are selected to meet the Formula (9). With the Formula (9) being met, the superiority of the sample servo format over the sector servo format in terms of the storage capacity is established.

For example, for a line density of 4000 bits/mm and a radius of 20 mm, as in the example of Embodiment 1, when head amplifiers having a recording/reproduction switching time of 1.5 μs or less are used for a format of 400 servo areas and a 6 μs servo area length, the superiority of the sample servo format over the sector servo format is established.

Embodiment 3:

The number of servo areas per track (circuit) and the head amplifiers are selected to meet the following Formula (10):

$$[\text{number of servo areas}] \times [\text{head amplifier recording/reproduction mode switching time } (\mu s)] = WR \leq 1200 \quad (10)$$

For example, when the number of servo areas is 400, head amplifiers having a recording/reproduction mode switching time of 3 μs or less are used. A gap equivalent to 3 μs is placed immediately after the data area. This gap has a length of about 22.6 μs in the case of 60 revolutions/sec and a radius of 20 mm. Consequently, servo information can surely be reproduced during the passage of the head over the servo area following data recording.

If the left side of the Formula (9) is set to a value of 1200 or greater, the capacity which can be accomplished will be smaller than the conventional format, and therefore this value is set to 1200 or smaller.

This Embodiment 3 compares to the setting of 400 servo areas and 4.5 μs servo area length when the line density is 4000 bits/mm and the radius is 20 mm in the Formula (9). This is the minimum servo occupancy rate (10.8%) for accomplishing the sample servo system.

Embodiment 4:

The number of servo areas per track (circuit) and the head amplifiers can be selected to meet the following Formula (11):

$$[\text{number of servo areas}] \times [\text{head amplifier recording/reproduction mode switching time } (\mu s)] = WR \leq 600 \quad (11)$$

For example, when the number of servo areas is 400, head amplifiers having a recording/reproduction mode switching time of 1.5 μs or less are used. A gap equivalent to 1.5 μs is placed immediately after the data area. This gap has a length of about 11.3 μm in the case of 60 revolutions/sec and a radius of 20 mm. Consequently, servo information can surely be reproduced during the passage of the head over the servo area following data recording.

This embodiment compares to the setting of 400 servo areas and 6 us servo area length (servo occupancy rate: 14.4%) when the line density is 4000 bits/mm and the radius is 20 mm in the Formula (9). These are practical values for accomplishing the sample servo system.

Figure 11:
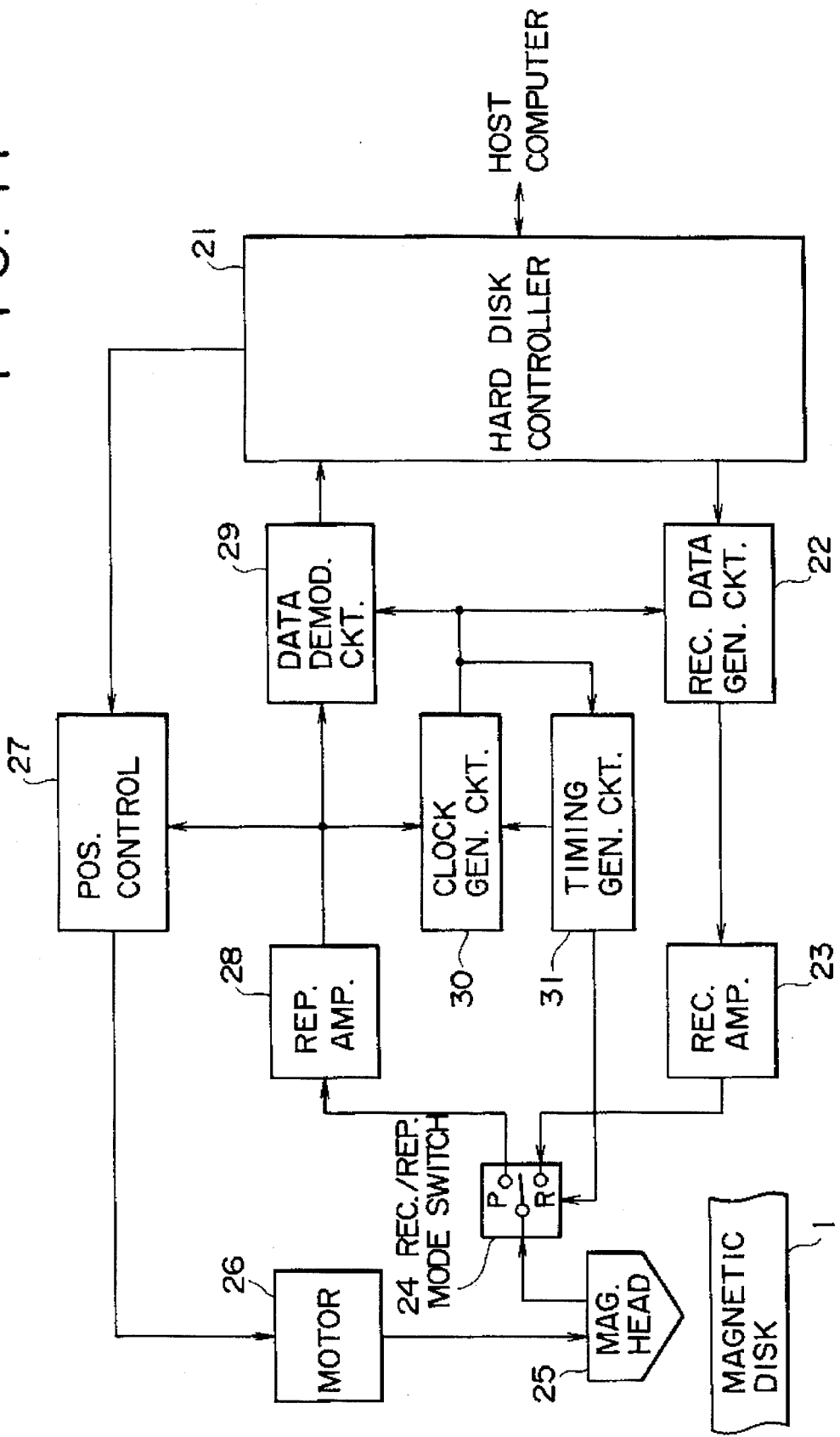
FIG. 11 is a block diagram showing the arrangement of the disk drive unit based on an embodiment of this invention.

Recording/reproduction operation:

An embodiment of the magnetic disk unit for recording or reproducing data on the foregoing magnetic disk will be explained with reference to FIG. 11. The arrangement of the formatting of the magnetic disk 1 is as shown in FIG. 16 and FIGS. 17(a) and 17(b), although the particular lengths of the areas, etc., are dictated by the present invention. The gap lengths, the number of servo areas, and a mode switching time of a recording amplifier 23 and reproduction amplifier 28 as head amplifiers are selected to meet at least one of the Formulas (7), (9), (10) and (11). The magnetic head 25 is moved by a motor 26 to a specified position by being controlled by a position control circuit 27 so that a specified track of the magnetic disk 1 is accessed.

A hard disk controller 21 receives data from a host computer (not shown) and delivers the data to a record data generation circuit 22. The record data generation circuit 22 converts the input data into record data and delivers the resulting data to the magnetic head 25 by way of the recording amplifier 23 and a contact R of a switch 24.

Data reproduced by the magnetic head 25 on the magnetic disk 1 is fed through a contact P of the switch 24 and reproduction amplifier 28 to the position control circuit 27, data demodulation circuit 29 and clock generation circuit 30. The data demodulation circuit 29 demodulates the input data and delivers the result to the hard disk controller 21.

The clock generation circuit 30 generates a clock from the data provided by the reproduction amplifier 28, and supplies the resulting clock to the record data generation circuit 22, data demodulation circuit 29 and timing generation circuit 31. The timing generation circuit 31 produces various timing signals based on the received clock, and supplies the timing signals to the clock generation circuit 30 and switch 24.

The position control circuit 27 reads the signals of the fine pattern and access pattern in the output of the reproduction amplifier 28, and detects the position of the magnetic head 25. It controls the motor 26 based on the detection result thereby to move the magnetic head 25 to the specified position.

Figure 12:
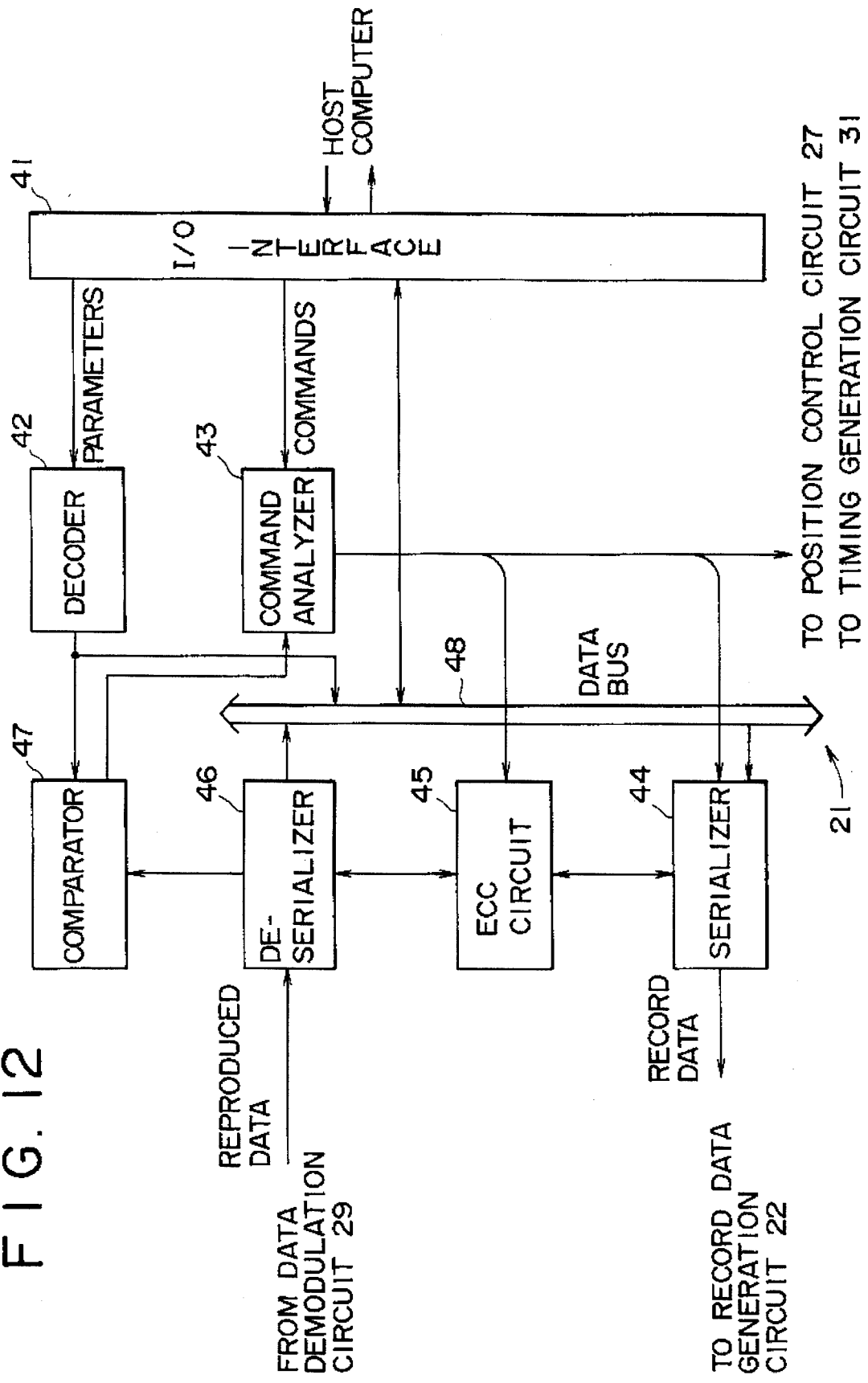
FIG. 12 is a block diagram showing an embodiment of the arrangement of the hard disk controller 21 of FIG. 11.
Figure 14:
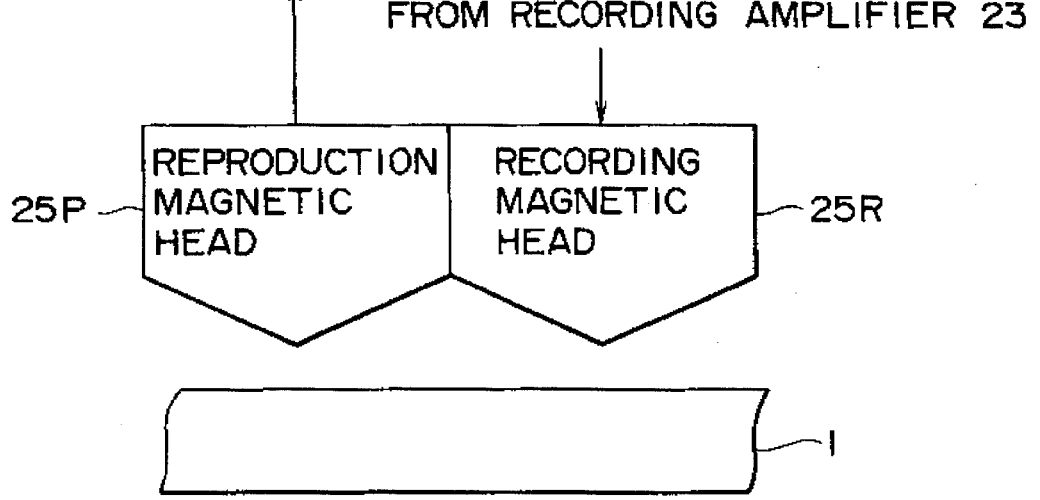
FIG. 14 is a diagram showing another example of the arrangement of the magnetic head 25.
Figure 15:
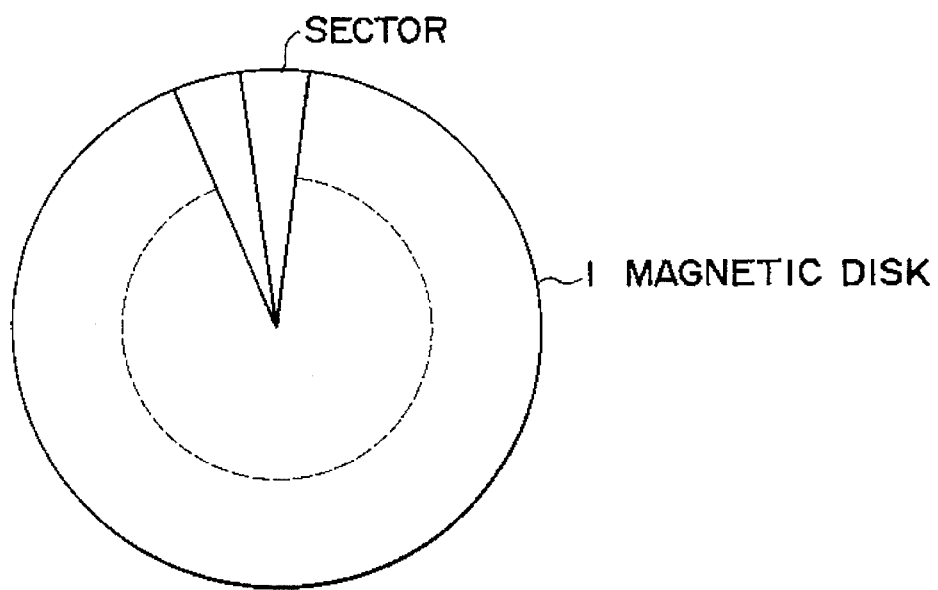
FIG. 15 is a diagram explaining the format of the conventional magnetic disk.

The hard disk controller 21 is arranged as shown in FIG. 12 for example. Data sent from the host computer is fed from an input/output interface 41 to a serializer 44 over the data bus 48. The serializer 44 delivers the input data to an ECC circuit 45, by which an error correction code, is appended to the data, and converts the parallel data into serial data and delivers the resulting data to the record data generation circuit 22.

Data provided by the data demodulation circuit 29 is fed to a deserializer 46. The deserializer 46 delivers the reproduced data to the ECC circuit 45, by which the error correction process is implemented, and thereafter converts the serial data into parallel data and delivers the resulting data through the interface 41 over the data bus 48 to the host computer.

A command analyzer 43 analyzes a command sent from the host computer through the interface 41 and controls the ECC circuit 45, serializer 44, position control circuit 27 and timing generation circuit 31 to implement the process for that command.

A decoder 42 decodes parameters sent from the host computer by way of the interface 41 and supplies the result of decoding to a comparator 47. The comparator 47 compares, for example, the ID included in the reproduced data provided by the deserializer 46 with the ID provided by the decoder 42, and delivers the comparison result to the command analyzer 43. The ID provided by the decoder 42 can be delivered to the serializer 44 over the data bus 48.

Next, the operation will be explained with reference to the timing chart of FIGS. 13(a)–(f). FIG. 13(a) shows part of a concentric track on the disk surface by stretching it along a straight line. In order to record in synchronism with the clock pattern in the data recording mode while applying the tracking servo, it is necessary to repeat alternately the reproduction of the clock pattern and fine pattern and the data recording in the data area. For this operation, the switch 24 is controlled by the recording/reproduction switching signal generated by the timing generation circuit 31.

In FIG. 13(b), the recording/reproduction switching signal is initially high, causing the magnetic head 25 to be connected through the switch 24 to the reproduction amplifier 28. At this time, an isolated waveform for the clock pattern appears as a reproduction output waveform (FIG. 13(d)). The timing generation circuit 31 anticipates the time of emergence of the clock pattern based on the past event and produces a clock gate signal (FIG. 13(c)). The clock generation circuit 30 assumes the isolated reproduction waveform emerging during the active period of the clock gate signal (FIG. 13(c)) to be the nominal clock pattern, and varies the phase of its internal PLL so that the data clock (FIG. 13(e)) is in-phase with the clock pattern.

In the servo system, the position control circuit 27 calculates the displacement of the magnetic head 25 from the center of the track to be recorded based on the reproduced signal of the fine pattern, and the motor 26 is activated accordingly. This operation takes place at each emergence of the servo pattern, and consequently the magnetic head 25 is positioned accurately on the track center.

Following the passage of the fine pattern, the recording/reproduction switching signal (FIG. 13(b)) to the timing generation circuit 31 goes low, causing the magnetic head 25 to connect to the recording amplifier 23 by way of the switch 24, and the data area is recorded. Source data from the host computer is formed into record data (FIG. 13(f)) that is synchronous with the rise of data blocks (FIG. 13(e)) by the record data generation circuit 22, and the data is recorded by the recording amplifier 23 on the magnetic disk 1.

On expiration of a certain time length (which is a multiple of the clock period in the presence of data) which corresponds to the length of one data area, the timing generation circuit 31 returns the recording/reproduction switching signal (FIG. 13(b)) to high. Consequently, the switch 24 changes, causing the reproduced signal of the clock pattern to be fed to the clock generation circuit 30 again, and the clock generation proceeds. The servo system continues the head positioning to the track center based on the reproduced signal of fine pattern.

The reproduction waveform (FIG. 13(d)) shows that the output of the reproduction amplifier 28 does not settle after the recording of the data area until the reproduced signal of the clock pattern emerges (during the head amplifier recording/reproduction mode switching time). However, the gap is placed in the area on the disk for this time, and there is no problem.

Other embodiments:

Although in the foregoing embodiments clock patterns are formed radially and consecutively on the disk surface, they may be formed intermittently along the radius. Although the clock pattern, access pattern and fine pattern are formed by etching on the disk surface, they may be magnetized patterns recorded by magnetic recording on the conventional flat recording medium.

Although the magnetic head described above is a generally-used recording/reproduction head, separate heads, e.g. heads 25R and 25P (not shown) dedicated to recording and reproduction may be used. Alternatively, a reproduction head based on another principle capable of detecting patterns such as the clock pattern and the transition of magnetization within a data segment may be used.

Although the present invention has been described for the case of a magnetic disk unit, the present invention is also applicable to disk drive units that record or reproduce digital data on disks such as an optical disk and opto-magnetic disk.

According to the inventive disk drive unit described above, in which the value N×(Ts+Th) is set smaller than or equal to 16,600–(25,600/(D×R))×C, it becomes possible to enhance the format efficiency for disks of the sample servo type as compared with the case of disks of the sector servo type.

Although the present invention has been shown and described with respect to certain preferred embodiments, various changes and modifications which are obvious to a person skilled in the art to which the invention pertains are deemed to lie within the spirit and scope of the invention as claimed.

What is claimed is:

1. A disk drive unit for recording and reproducing data through head amplifiers on a disk shaped recording medium on which data areas for recording data and servo areas for recording servo information are formed, the disk shaped recording medium having N (N≧200) servo areas per track, the disk drive unit comprising:

means for switching between a recording mode and a reproduction mode in a switching time of Th (in μs), and wherein the number N of servo areas per track multiplied by the sum of the length of one servo area Ts (μs) and the recording/reproduction mode switching time Th (μs) of the head amplifiers, i.e., N×(Ts+Th), is less than or equal to 16,600–(25,600/(D×R))×C, where C (bytes) is the capacity per track, D (bits/mm) is the line density of the track and R (mm) is the radius of the track.

2. A disk drive unit according to claim 1, wherein the product N×(Ts+Th) is smaller than or equal to 2,830+14,080,000/(D×R).

3. A disk drive unit according to claim 1, wherein the head amplifier recording/reproduction mode switching time Th is chosen so that the product of Th and the number of servo areas N, i.e., N×Th, is smaller than or equal to 1,200.

4. A disk drive unit according to claim 1, wherein the head amplifier recording/reproduction mode switching time Th is chosen so that the product of Th and the number of servo areas N, i.e., N×Th, is smaller than or equal to 600.

5. A disk drive unit according to claim 1, wherein the disk shaped recording medium comprises a magnetic disk shaped recording medium.

6. In combination, a disk shaped recording medium on which data areas for recording data and servo areas for recording servo information are formed and a disk drive unit for recording or reproducing data through head amplifiers on the disk shaped recording medium, wherein the improvement comprises that:

the disk shaped recording medium has N servo areas per track (N≦200), Ts (μs) is a length of each the servo area, each track has a capacity of C (bytes), a line density of D (bits/mm), and a radius of R (mm);

the disk drive unit has a means for switching between the head amplifiers for a recording mode and a reproduction mode in a switching time of Th, measured in (μs); and wherein:

$$N \times (Ts+Th) \leq 16{,}600 - [(25{,}600/(D \times R)) \times C].$$

7. A disk shaped recording medium, comprising:

a plurality of recording tracks, each track including:

a plurality of data areas for recording data;

a plurality of N (where N≧200) servo areas for recording servo information, each servo area following a different data area along a recording track on the disk shaped recording medium; and a plurality of gaps for allowing a mode switching time Th (in μs) until a reproduction amplifier settles when switching from a recording amplifier to the reproduction amplifier of a recording and reproduction apparatus, each gap of the plurality of gaps being provided between a different data area and a different servo area, and wherein the gap length is sufficient to allow a mode switching time Th which satisfies a following formula:

$$Th \leq 16,600/N - Ts - (25,600 \times C)/(D \times R \times N),$$

where Ts (in μs) is a length of one of the servo areas, N (≧200) is the desired number of servo areas per track, C (in bytes) is a desired capacity per track, D (in bits/mm) is a desired line density per track and R (in mm) is a desired track radius.

8. The disk shaped recording medium of claim 7, wherein the desired capacity C per track is:

$$C = 0.538 \times D \times R - 550.$$

9. The disk shaped recording medium of claim 8, wherein the desired line density D is 4000 (bits/mm).

10. The disk shaped recording medium of claim 9, wherein the desired radius R is 20 mm.

11. The disk shaped recording medium of claim 10, wherein the desired number of servo areas N per track is 400.

12. The disk shaped recording medium of claim 11, wherein the length Ts of one of the servo areas is 4.5 (μs).

13. The disk shaped recording medium of claim 12, wherein the mode switching time Th is 3 (μs).

14. The disk shaped recording medium of claim 11, wherein the length Ts of one of the servo areas is 6.0 (μs).

15. The disk shaped recording medium of claim 14, wherein the mode switching time Th is 1.5 (μs).

16. The disk shaped recording medium of claim 7, wherein:

a clock pattern is preformed on each servo area for providing a reproducible clock signal for recording and reproduction timing for either or both of a recording apparatus and a reproducing apparatus.

17. The disk shaped recording medium of claim 16, wherein the recording medium comprises a magnetic disk shaped recording medium.

18. A recording and reproducing apparatus for recording data on a disk shaped recording medium and reproducing data from the disk shaped recording medium of the type having a plurality of tracks, each track having a plurality of data areas for recording data, a plurality of servo areas for recording servo information, and a plurality of gaps provided between each of the plurality of data areas and servo areas, the recording and reproducing apparatus comprising:

a receiving means for receiving recording data;

a recording amplifying means for amplifying the recording data to produce amplified recording data;

a recording means for recording the amplified recording data on the disk shaped recording medium;

a reproducing means for reproducing data from the disk shaped recording medium to produce reproduced data;

a reproducing amplifying means for amplifying the reproduced data to produce amplified reproduced data;

a timing generating means for generating a timing signal by using the amplified reproduced data; and a selecting means for selecting between connecting to the recording amplifying means and the reproducing amplifying means according to a timing signal produced from the reproduced data such that the selecting coincides with each of the gaps, the selecting means having a mode switching time of Th (in μs) satisfying a following formula:

$$Th \geq 16,600/N - Ts - (25,600 \times C)/(D \times R \times N),$$

where Ts (in μs) is a length of each one of the servo areas, N (≧200) is the desired number of servo areas per track, C (in bytes) is a desired capacity per track, D (in bits/mm) is a desired line density per track and R (in mm) is a desired track radius.

19. The recording and reproducing apparatus of claim 18, wherein the desired capacity C per track is:

$$C = 0.538 \times D \times R - 550.$$

20. The recording and reproducing apparatus of claim 19, wherein the desired line density D is 4000 (bits/mm).

21. The recording and reproducing apparatus of claim 20, wherein the desired radius R is 20 mm.

22. The recording and reproducing apparatus of claim 21, wherein the desired number of servo areas N per track is 400.

23. The recording and reproducing apparatus of claim 22, wherein the length Ts of one of the servo areas is 4.5 (μs).

24. The recording and reproducing apparatus of claim 23, wherein the mode switching time Th is 3 (μs).

25. The recording and reproducing apparatus of claim 22, wherein the length Ts of one of the servo areas is 6.0 (μs).

26. The recording and reproducing apparatus of claim 25, wherein the mode switching time Th is 1.5 (μs).

27. The recording and reproducing apparatus of claim 18, wherein:

a clock pattern is preformed on each servo area; and further comprising means for reproducing a clock signal from the clock pattern for recording timing and reproduction timing.

28. The recording and reproducing apparatus of claim 27, wherein the recording medium comprises a magnetic disk shaped recording medium.

29. A disk shaped recording medium of the type having a plurality of tracks, comprising:

a plurality of data areas in each track for recording data;

a plurality of servo areas in each track for recording servo information; and a plurality of gaps for allowing mode switching time until a reproduction amplifier settles when switching from a recording amplifier to the reproduction amplifier, each of the plurality of gaps being provided between each of the plurality of data areas and servo areas, the mode switching time Th(μs) using a following formula:

$$Th \leq 16,600/N - Ts - (25,600 \times C)/(D \times R \times N),$$

where Ts (in μs) is a length of one of the servo areas, N (≧200) is the desired number of servo areas per track, C (in bytes) is a desired capacity per track, D (in bits/mm) is a desired line density per track and R (in mm) is a desired track radius.

30. The disk shaped recording medium of claim 29, wherein the desired capacity C per track is:

$C=0.538 \times D \times R - 550$.

31. The disk shaped recording medium of claim 30, wherein the desired line density D is 4000 (bits/mm).

32. The disk shaped recording medium of claim 31, wherein the desired radius R is 20 mm.

33. The disk shaped recording medium of claim 32, wherein the desired number of servo areas N per track is 400.

34. The disk shaped recording medium of claim 33, wherein the length Ts of one of the servo areas is 4.5 (μs).

35. The disk shaped recording medium of claim 34, wherein the mode switching time Th is 3 (μs).

36. The disk shaped recording medium of claim 33, wherein the length Ts of one of the servo areas is 6.0 (μs).

37. The disk shaped recording medium of claim 36, wherein the mode switching time Th is 1.5 (μs).

38. The disk shaped recording medium of claim 29, wherein:

a clock pattern is preformed on each servo area for providing a reproducible clock signal for recording and reproduction timing for either or both of a recording apparatus and a reproducing apparatus.

39. The disk shaped recording medium of claim 38, wherein the recording medium comprises a magnetic disk shaped recording medium.

40. A disk shaped recording medium of the type which includes a plurality of tracks, comprising:

a plurality of data areas in each track for recording data;

a plurality of servo areas in each track for recording servo information, each servo area being separated from an immediately preceding data area by a different gap of a plurality of gaps in each track; and wherein each gap of the plurality of gaps accommodates a mode switching time Th (in μs) for allowing a reproduction amplifier to settle when switching from a recording amplifier to the reproduction amplifier of a recording and reproduction apparatus, and wherein each gap has a length (measured in μs) which is greater than or equal to 1.5 μs and less than or equal to $16,600/N - Ts - (25,600 \times C)/(D \times R \times N)$, where Ts (in μs) is a length of one of the servo areas, N ($\geq 200$) is the desired number of servo areas per track, C (in bytes) is a desired capacity per track, D (in bits/mm) is a desired line density per track and R (in mm) is a desired track radius.

\* \* \* \* \*